(12) United States Patent
Bhongale et al.

(10) Patent No.: US 10,591,631 B2
(45) Date of Patent: Mar. 17, 2020

(54) MEASURING GRAVITY CURVATURE FOR MAPPING SUBTERRANEAN FORMATIONS

(71) Applicant: HALLIBURTON ENERGY SERVICES, INC., Houston, TX (US)

(72) Inventors: Satyan Gopal Bhongale, Cypress, TX (US); Michel Joseph Leblanc, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 349 days.

(21) Appl. No.: 15/512,539

(22) PCT Filed: Dec. 8, 2015

(86) PCT No.: PCT/US2015/064468
§ 371 (c)(1),
(2) Date: Mar. 17, 2017

(87) PCT Pub. No.: WO2017/099727
PCT Pub. Date: Jun. 15, 2017

(65) Prior Publication Data
US 2017/0329043 A1    Nov. 16, 2017

(51) Int. Cl.
*G01V 7/04* (2006.01)
*G01V 7/02* (2006.01)
(Continued)

(52) U.S. Cl.
CPC .............. *G01V 7/04* (2013.01); *E21B 47/10* (2013.01); *E21B 49/008* (2013.01); *G01V 7/02* (2013.01)

(58) Field of Classification Search
CPC .. G01V 7/04; G01V 7/02; E21B 47/10; E21B 49/008
See application file for complete search history.

(56) References Cited

U.S. PATENT DOCUMENTS 3,947,125 A    3/1976 West
9,086,429 B1 *  7/2015 Biedermann .......... G01C 19/62
(Continued)

OTHER PUBLICATIONS

Bidel et al., "Compact cold atom gravimeter for field applications", Applied Physics Letters 102, 144107 (2013) (Year: 2013).*
(Continued)

*Primary Examiner* — Nathaniel T Woodward
(74) *Attorney, Agent, or Firm* — McGuireWoods, LLP

(57) ABSTRACT

Gravity surveys of subterranean formations may be based on the simultaneous measurement of gravity and its derivatives to produce a higher resolution formation map or wellbore log. For example, a method of performing a gravity survey may include positioning a matter wave interferometer relative to a subterranean formation; producing at least one cloud of atoms in the matter wave interferometer; producing a superposition of atoms in two different, spatially separated superimposed clouds from each of the at least one cloud of atoms; propagating the two different, spatially separated superimposed clouds along the matter wave interferometer as they with a gravitational field of the subterranean formation; combining the two different, spatially separated superimposed clouds with a Raman laser beam; measuring an interference produced by producing and combining the two different, spatially separated superimposed clouds; and calculating gravity for the gravitational field of the subterranean formation based on the interference.

21 Claims, 6 Drawing Sheets

(51) Int. Cl.
*E21B 47/10* (2012.01)
*E21B 49/00* (2006.01)

(56) References Cited

U.S. PATENT DOCUMENTS

| | | | |
|---|---|---|---|
| 2009/0223291 A1 | 9/2009 | Donadille et al. | |
| 2011/0042073 A1* | 2/2011 | Legendre | E21B 49/00 |
| | | | 166/250.01 |
| 2012/0002504 A1 | 1/2012 | Muyzert et al. | |
| 2014/0026654 A1 | 1/2014 | Klopping et al. | |
| 2014/0190254 A1* | 7/2014 | Bouyer | G01V 7/14 |
| | | | 73/382 G |
| 2014/0319329 A1* | 10/2014 | Bidel | G21K 1/006 |
| | | | 250/251 |
| 2016/0178792 A1* | 6/2016 | Kasevich | G01V 7/14 |
| | | | 73/382 R |

OTHER PUBLICATIONS

International Search Report and Written Opinion for PCT/US2015/064468 dated Sep. 28, 2016.

* cited by examiner

MEASURING GRAVITY CURVATURE FOR MAPPING SUBTERRANEAN FORMATIONS

BACKGROUND

The present application relates to gravity surveys of subterranean formations.

A gravimeter detects changes in the strength of a gravitational field measured in units of acceleration at the location of the gravimeter, which depends on the density and distance of the materials around the gravimeter. In a wellbore application, a gravimeter measures the gravity and, in some instances, the gravity gradient in the wellbore. Gravity, when referring to a measurable quantity, is used herein to refer to the strength or magnitude of the gravitational field that typically is reported in units of acceleration. The gravitational gradient is the first order spatial derivative of gravity along a specific direction in space.

Gravity and derivatives thereof depend on the composition of the surrounding subterranean formation and fluids therein. From this information, a map of a formation or a log of a wellbore may be produced that indicates where reservoir, water body, fracture, and heterogeneous portions of the formation are located. The formation maps and wellbore logs, however, tend to have low resolution due to the accuracy with which one can measure the gravity and its derivatives such as the gradient and the curvature.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to gravity surveys of subterranean formations based on the simultaneous measurement of gravity and its derivatives, which produces a higher resolution formation map or wellbore log.

As used herein, the term "derivative of gravity," "derivatives of gravity," and grammatical variations thereof refer to the first, second, third, fourth, fifth, sixth, and so on derivative of gravity and combinations thereof unless otherwise specified as a specific derivative order like "first order derivative of gravity."

In order to simultaneously measure gravity and its derivatives, a matter wave interferometry technique is employed in the methods and apparatuses described herein. The matter wave interferometry technique is based on the quantum mechanics fundamental that atoms can behave like waves. Because atoms are strongly affected by gravity, and because matter waves have very short wavelength (shorter than light), the matter wave interferometer has significantly greater precision than traditional gravimeters. Further, in some instances, gravity at several spatially separated points may be measured simultaneously, which allows for higher precision measurements of the higher order derivatives like a gravitation curvature, which is the second order derivative of gravity. By measuring the higher order derivatives of gravity with greater precision, this technique may allow for centimeter resolution of the earth's gravitation field and, consequently, of the formation maps and well logs derived therefrom.

Figure 1:
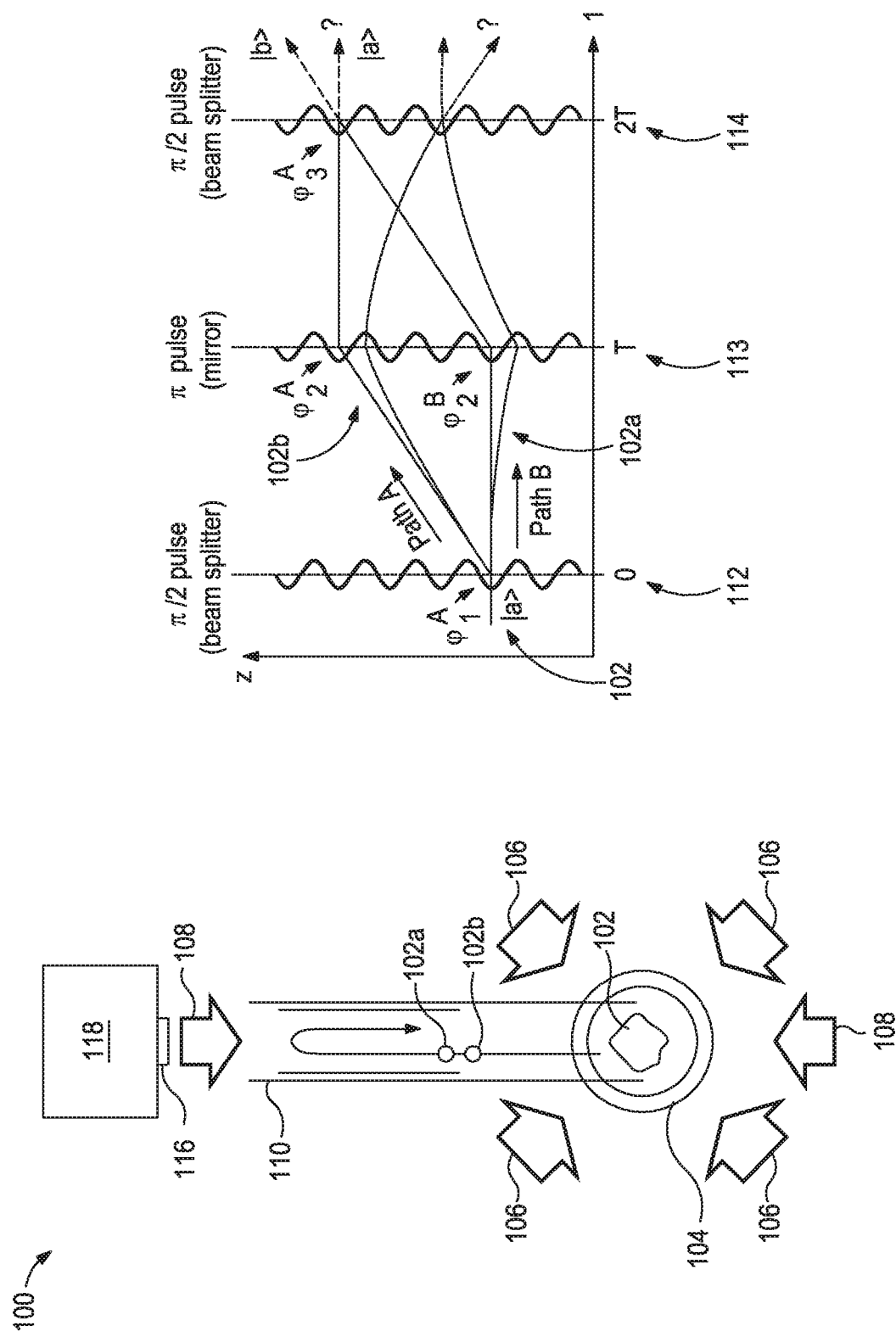
FIG. 1 provides illustrative diagrams of a matter wave interferometer and the related measurement technique.

FIG. 1 provides illustrative diagrams of a matter wave interferometer 100 and the related quantum states of the atoms during the measurement technique. A cloud of laser cooled atoms 102 (also referred to herein as a cloud of atoms 102) is prepared in a specific internal state at low temperatures ($|a\rangle$) and is maintained in position with a series of trapping coils 104 and trapping laser light 106. In an alternative embodiment, the trap may be a magneto optical trap. Cesium is an exemplary element that may be used for the cloud of atoms 102. Any other suitable element could be used that has the quantum level structure suitable for the interferometry (e.g., sodium, potassium, or rubidium). In some instances, the trapping laser light 106 may be from a laser that is a portion of or that is co-located with the matter wave interferometer 100. In some instances, the trapping laser light 106 may be conveyed to the matter wave interferometer 100 via fiber optics. For example, the matter wave interferometer 100 may be downhole or located separate from the trapping laser, where the trapping laser light 106 is conveyed through fiber optics to the matter wave interferometer 100.

The cloud of atoms 102 is irradiated with the Raman laser beams 108 (also referred to herein as Raman laser light) in counter propagating directions, which is achieved by the mirror 116 attached to the vibration isolator 118. The counter propagating Raman laser beams 108 act as a beamsplitter. The frequencies of the two laser beams differ exactly by the same amount as the energy level difference between atomic states $|a\rangle$ and $|b\rangle$. It drives two photon Raman transition between the atomic states $|a\rangle$ and $|b\rangle$. When the atom undergoes transition from $|a\rangle$ to $|b\rangle$, it acquires additional momentum $\hbar(k_1+k_2)$ where $k_1$ and $k_2$ are the wavevectors of the two Raman beams. Similarly when the atom makes a transition from $|b\rangle$ to $|a\rangle$, it acquires an additional momentum of $-\hbar(k_1+k_2)$. A $\pi/2$-Raman pulse 112 creates atoms in superposition states represented by the wavefunction $|\phi_1^A\rangle + |\phi_1^B\rangle$. Since the state $|\phi_1^B\rangle$ has a different momentum than $|\phi_1^A\rangle$, the cloud of atoms 102 effectively splits into a superposition of atoms in two different, spatially separated superimposed clouds 102a and 102b. However, it should be noted that each individual atom is present in both clouds at the same time. The two clouds take different trajectories 102a and 102b along the columnar magnetic shield 110 in the gravitational field, and hence acquire different gravity induced phase. After a certain time T, a $\pi$-Raman pulse 113 is applied that interchanges the internal states $|a\rangle$ and $|b\rangle$. Thus, each atom is represented by the wavefunction $|\phi_2^A\rangle + |\phi_2^B\rangle$. Again, the two clouds propagate differently under the gravitational field, and acquire different phase shifts due to gravity. After additional time T, another π/2-Raman pulse 114 is applied. This pulse 114 again acts like a beam splitter with atom beams entering both the input ports of the beam splitter. The difference in the atomic population in internal states |a⟩ and |b⟩ after π/2-Raman pulse 114 is measured and is related to the gravitational acceleration. The probability of the atoms after the second beam splitter to be in state |a⟩ is given by $$P_a = \frac{1 - \cos(\phi)}{2}$$

where $\phi$ is the phase shift given by $\phi=(k_1+k_2)gT^2$ and g is the gravitational acceleration.

The matter wave interferometer 100 also includes a vibration isolation device 118, which as illustrated is coupled to the mirror 116, to mitigate noise due to vibration of the matter wave interferometer 100. The vibration isolation device 118 may be coupled to one or more components of the matter wave interferometer 100.

While FIG. 1, and other illustrations herein, include Raman laser beams 108 in counter propagating directions, one skilled in the art with the benefit of this disclosure would recognize that the Raman laser beams 108 may be in co-propagating directions.

Figure 2:
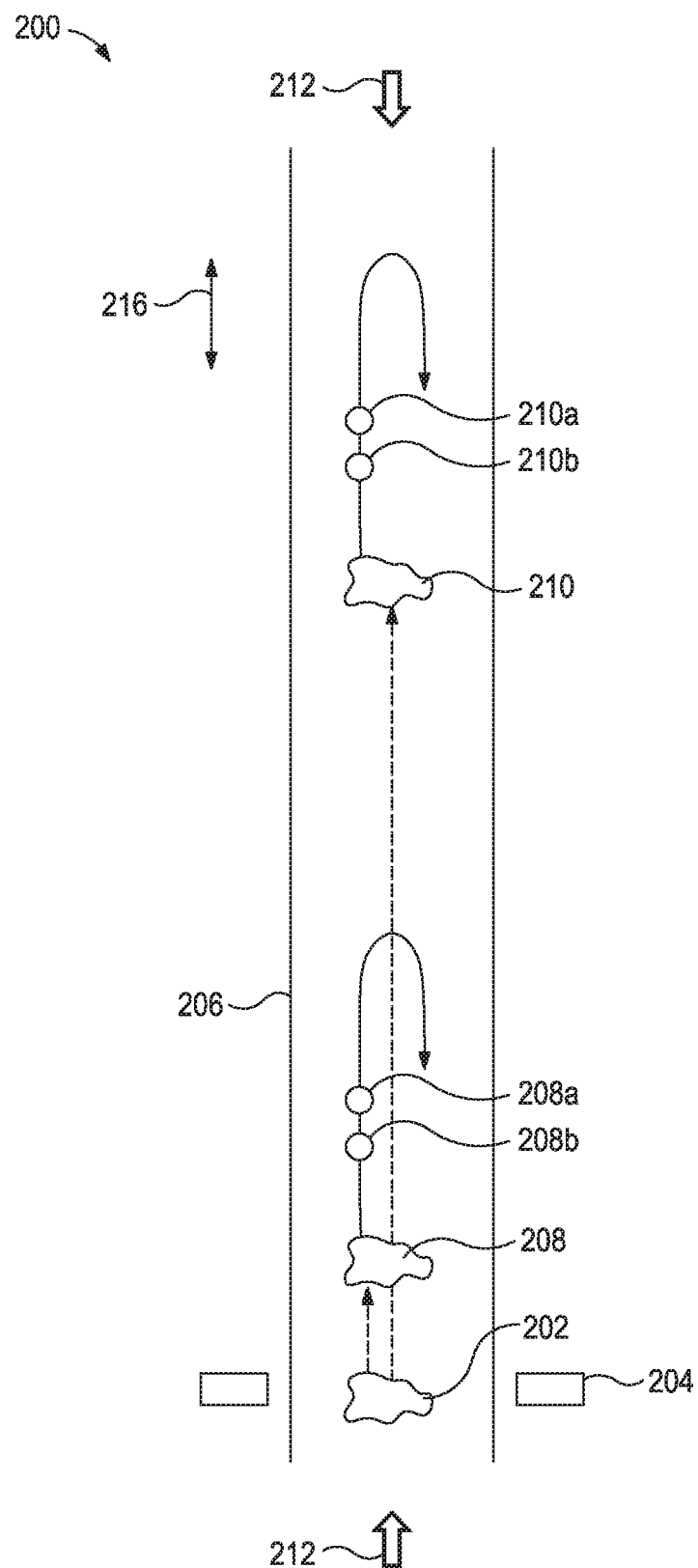
FIG. 2 provides an illustrative diagram of a matter wave interferometer for measuring gravitational gradients.

FIG. 2 provides an illustrative diagram of a portion of a matter wave interferometer 200 for measuring gravitational gradients. A cloud of atoms 202 is created in a magneto optical trap 204. The cloud of atoms 202 is split and launched vertically upwards within the columnar magnetic shield 206 use of moving optical molasses to produce two clouds of atoms 208,210 at different axial positions along the height 216 of the columnar magnetic shield 206. Because moving optical molasses to produce the two clouds of atoms 208,210 and not counter propagating Raman laser light, the two clouds of atoms 208,210 are substantially unaltered, just smaller in size relative to the original cloud of atoms 202.

Once separated into the two clouds of atoms 208,210, counter propagating Raman laser beams 212 irradiate both clouds of atoms 208,210. More specifically, a π/2-Raman pulse splits the clouds of atoms 208,210 each into a superposition of atoms in two different spatially separated superimposed clouds 208a,208b and 210a,210b, respectively, as described in FIG. 1. Similar to FIG. 1, a π-Raman pulse after time T is used to interchange the internal state of the atoms. Again, after another time interval T, a final π/2-Raman pulse combines the two split clouds 208a,208b and 210a,210b. The interference associated with each of the split and recombination of the clouds of atoms 208,210 is used to derive the value of gravity at two different locations and hence provide the value of gravity gradient, the first order derivative of gravity.

For measuring gravity gradients, it is not necessary to have the absolute value of gravity at two locations (or number of locations required to calculate the other derivatives of gravity). For example, a lissajous figure may be obtained by plotting the normalized population in the state |a> of the upper interferometer versus that of the lower interferometer. A fitting algorithm may be used to characterize the lissajous figure. As an example, the following parametric fitting algorithm may be used: x(t)=A sin(t)+B; and y(t)=C sin(t+φ)+D, where A and C are the amplitude of interference fringe in the upper and lower interferometer, while B and D are the coordinate of the ellipse/lissajous figure center, and φ is the differential phase shift between the upper and lower interferometer. Some other appropriate algorithm or a Bayesian estimator may also be used to extract the differential phase. The differential phase is directly related to the difference in gravity at the upper and lower location, which may be used to calculate or otherwise derive the gravity gradient. This procedure may also be applied to other derivatives of gravity.

Figure 3:
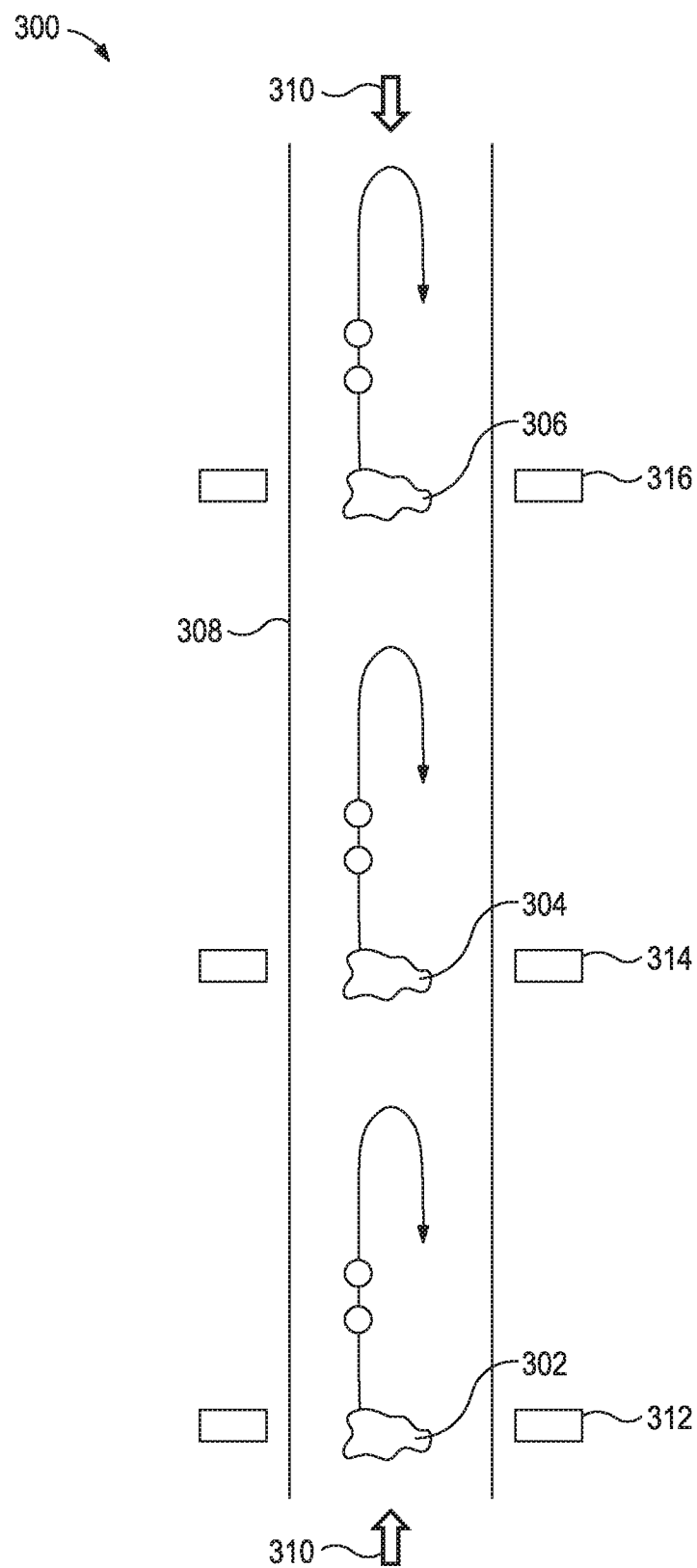
FIG. 3 provides an illustrative diagram of a matter wave interferometer for measuring gravitational curvature.

FIG. 3 provides an illustrative diagram of a portion of a matter wave interferometer 300 for measuring gravitational curvature. Three clouds of laser cooled atoms 302,304,306 are created at different heights along a columnar magnetic shield 308. In this example, the three clouds of laser cooled atoms 302,304,306 are produced separately and held in place by corresponding traps 312,314,316, respectively. Alternatively, the moving optical molasses may be used as described in FIG. 2 to produce the three clouds of laser cooled atoms 302,304,306 where the corresponding traps 312,314,316 may, optionally, be excluded from the matter wave interferometer 300.

After the three clouds of laser cooled atoms 302,304,306 are created, counter propagating Raman laser light 310 irradiates the clouds of atoms 302,304,306 to split the clouds of atoms 302,304,306 each into a superposition of atoms in two different spatially separated superimposed clouds as described in FIGS. 1 and 2. The interference associated with each of the split and recombined clouds of atoms 302,304, 306 is used to derive the gravity curvature, the second order derivative of gravity.

The matter wave interferometer may be moved relative to the subterranean formation to measure gravity and derivatives thereof throughout a portion of the formation. The composition of the materials that make up or are contained in the subterranean formation and position of those materials relative to the interferometer affect the interference experienced by each cloud of atoms during splitting and combining. The interference measured from each cloud of atoms may be compared to detect differences in the gravity at each of the locations of the clouds of atoms. By using two clouds of atoms (e.g., as illustrated in FIG. 2), gravity and the first derivative of gravity (the gravity gradient) may be measured or otherwise calculated. By using three clouds of atoms (e.g., as illustrated in FIG. 3), gravity, the gravity gradient, and the second derivative of gravity (the gravity curvature) may be measured or otherwise calculated. Additional clouds of atoms may be used to measure higher order derivatives of gravity.

In some instances, the two cloud of atoms 208,210 of FIG. 2 may be produced as described in FIG. 3 where each of the two clouds of atoms 208,210 has a corresponding trap. Accordingly, the number of desired clouds, which corresponds to the desired maximum derivative order of gravity being measured, may be produced by either of the configurations described in FIG. 2 (i.e., each cloud produced and positioned at different positions along the height of the columnar magnetic shield using moving optical molasses before splitting the clouds of atoms by Raman laser light) and FIG. 3 (i.e., each cloud before splitting by Raman laser light being held in traps at different positions along the height of the columnar magnetic shield).

The data gathered from the matter wave interferometer may be analyzed via common mode rejection and inversion modeling. The data may be presented in a 2-dimensional (2D) log or a 3-dimensional (3D) map of the subterranean formation.

The precision of the data increases by measuring more derivatives of gravity. In some instances, the resolution of the data may be on the cm scale.

The methods described herein may involve positioning a matter wave interferometer described herein relative to a subterranean formation and measuring a derivative of gravity for multiple locations in the subterranean formation with the matter wave interferometer. The positioning of the interferometer relative to a subterranean formation is in a suitable location for measuring the gravity and/or at least one derivative of gravity for a desired location within the subterranean formation.

Figure 4:
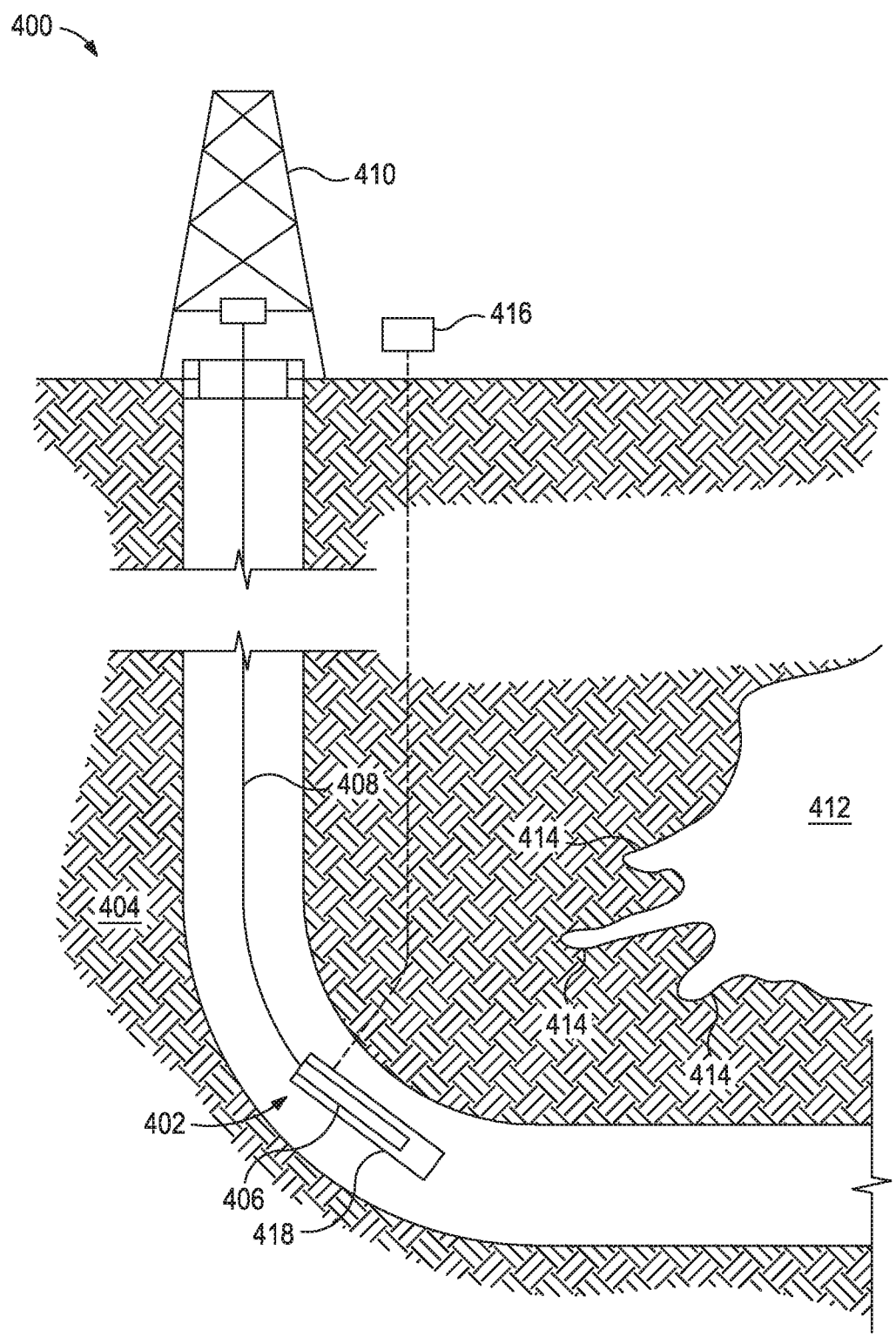
FIG. 4 provides an illustrative diagram of a downhole system for implementing a wellbore tool equipped with a matter wave interferometer described herein.

FIG. 4 provides an illustrative diagram of a system 400 for implementing a wellbore tool 402 equipped with a matter wave interferometer 404 (or at least a portion thereof) for measuring gravity and its derivatives of a subterranean formation 406. While the system 400 is illustrated as a land-based system, one skilled in the art would recognize that the principles may be translated to an off-shore system.

The wellbore tool 402 includes a housing 418 containing at least a portion of the matter wave interferometer 404. The housing 418 is also coupled to a conveyance 408 that extends from a rig 410. Exemplary conveyances 408 may include, but is not limited to, a wireline, a slickline, an electric line, a coiled tubing, a drill pipe, a production tubing, and the like. In some instances, the conveyance 408 may be equipped to transmit power from a surface location to the wellbore tool 402. Further, conveyance 408 may be equipped with fiber optic cable to transmit the laser light (e.g., for the Raman pulses or the counter propagating laser light that splits the clouds of atoms) to the matter wave interferometer 404. This configuration may be advantageous to reduce the amount of equipment needed in the wellbore tool 402 for the proper operation of the matter wave interferometer 404.

Illustrated in FIG. 4 is a water flood 412. In some instances, when the matter wave interferometer 404 is configured for two clouds of atoms (e.g., as illustrated in FIG. 2), the gravity and gravity gradient measurements may be useful in identifying a location of the water flood 412. In some instances, when the matter wave interferometer 404 is configured for three clouds of atoms (e.g., as illustrated in FIG. 3), the gravity, gravity gradient, and gravity curvature measurements may be useful in identifying the location of the water flood 412 and the dimensions of the fingers 414 of the water flood (i.e., the portions of the water flood 412 that are moving faster and extend beyond bulk of the water flood 412).

In some instances, the system 400 may include a control system 416 communicably coupled to a portion of the system 400 for performing the laser pulses and sequences for splitting and combining the clouds of atoms, measuring the interference produced when splitting and combining the clouds of atoms, calculating gravity and the appropriate derivatives thereof based on the configuration of the matter wave interferometer 404, recording the location of the matter wave interferometer 404 during each measurement, and the like. The control system 416 may also be useful in performing analyses of the foregoing to produce logs, maps, or the like of the subterranean formation based on the measured or otherwise calculated gravity and derivatives thereof.

While the system 400 illustrates the control system 416 at a surface location, the control system 416 may alternatively be within the wellbore tool 402. Additionally, in some instances, the control system 416 may be split into two or more portions where at least one portion is within the wellbore tool 402 and at least one other portion is at a surface location.

Communication between the control system 416 and other components of the system 400 may be achieved via wired communication (e.g., via cables in the conveyance 408), wireless communication (e.g., via radio-frequency communication), optical communication via optical fibers, or a combination thereof.

Figure 5:
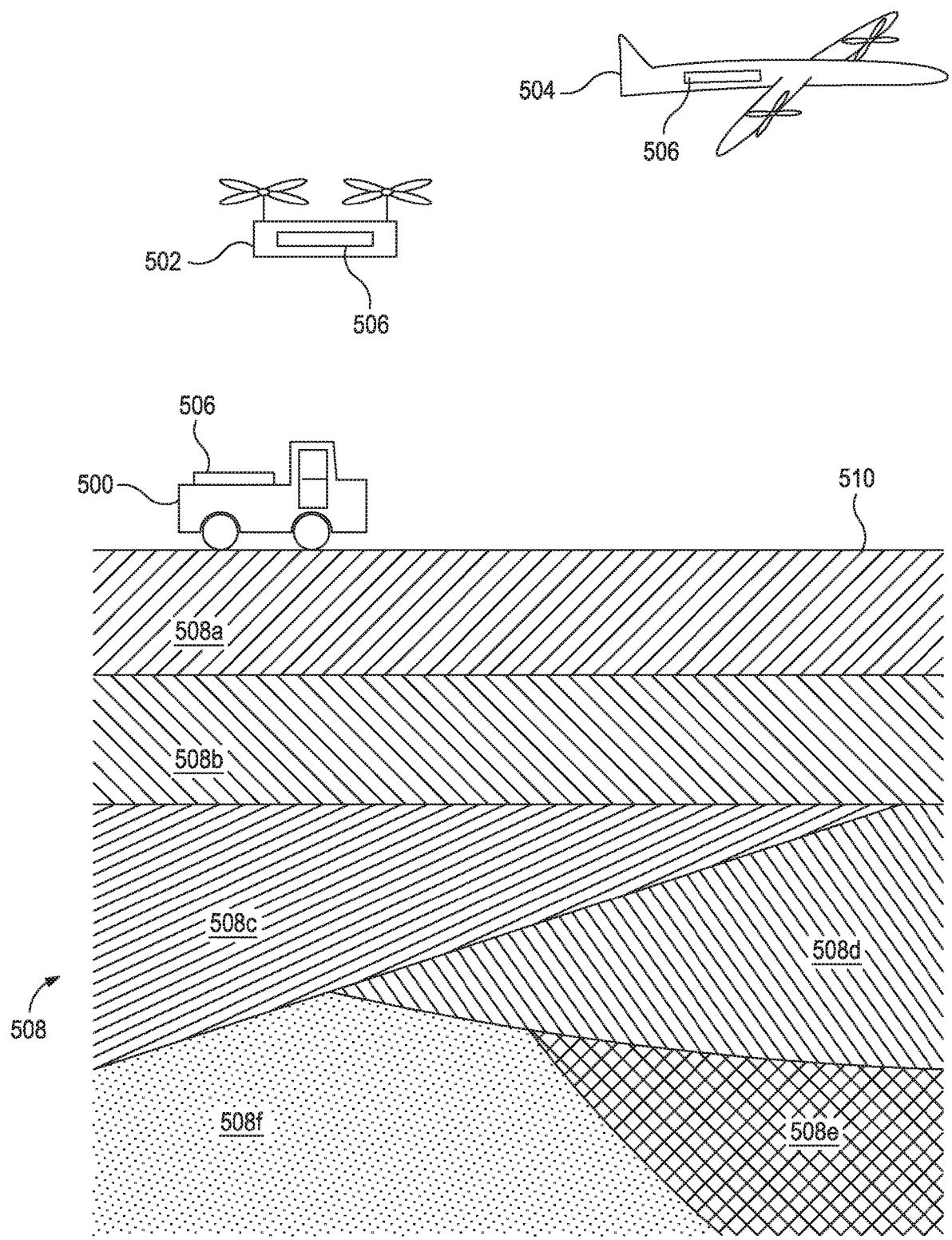
FIG. 5 provides an illustrative diagram of land- and air-based vehicles equipped with a matter wave interferometer described herein.

FIG. 5 provides an illustrative diagram of several vehicles 500,502,504 positioned relative to a subterranean formation 508 and equipped with a matter wave interferometer 506 for measuring gravity and its derivatives of a subterranean formation 508. The illustrated vehicles 500,502,504 include a land-based vehicle 500 and air-based vehicles or a drone 502 and an aircraft 504. The illustrated vehicles 500,502,504 may be used individually or in combination according to various embodiments of the present disclosure.

The vehicles 500,502,504 may be moved along the surface 510 or through the air relative to a subterranean formation 508 to measure gravity and derivatives thereof for analyzing the composition of the formation 508. The analyses may provide the boundaries between different portions of the formation 508a-f, the location of water or hydrocarbon fluids (not illustrated) within the formation, and the like as described herein.

In some instances, the vehicle 500,502,504 may be stationary or make several passes over the formation 508 to monitor the movement of the portions of the formation 508a-f (e.g., subsidence in a portion of the formation 508), the movement or progress of fluids within the formation, or a combination thereof over time.

The matter wave interferometer 506 for each of the vehicles 500,502,504 may independently be capable of measuring gravity and at least one derivative thereof and preferably at least gravity, gravity gradient, and gravity curvature.

Each of the vehicles 500,502,504 and/or the matter wave interferometers 506 may include control systems or portions of control systems (e.g., similar to control system 416 of FIG. 4).

Figure 6:
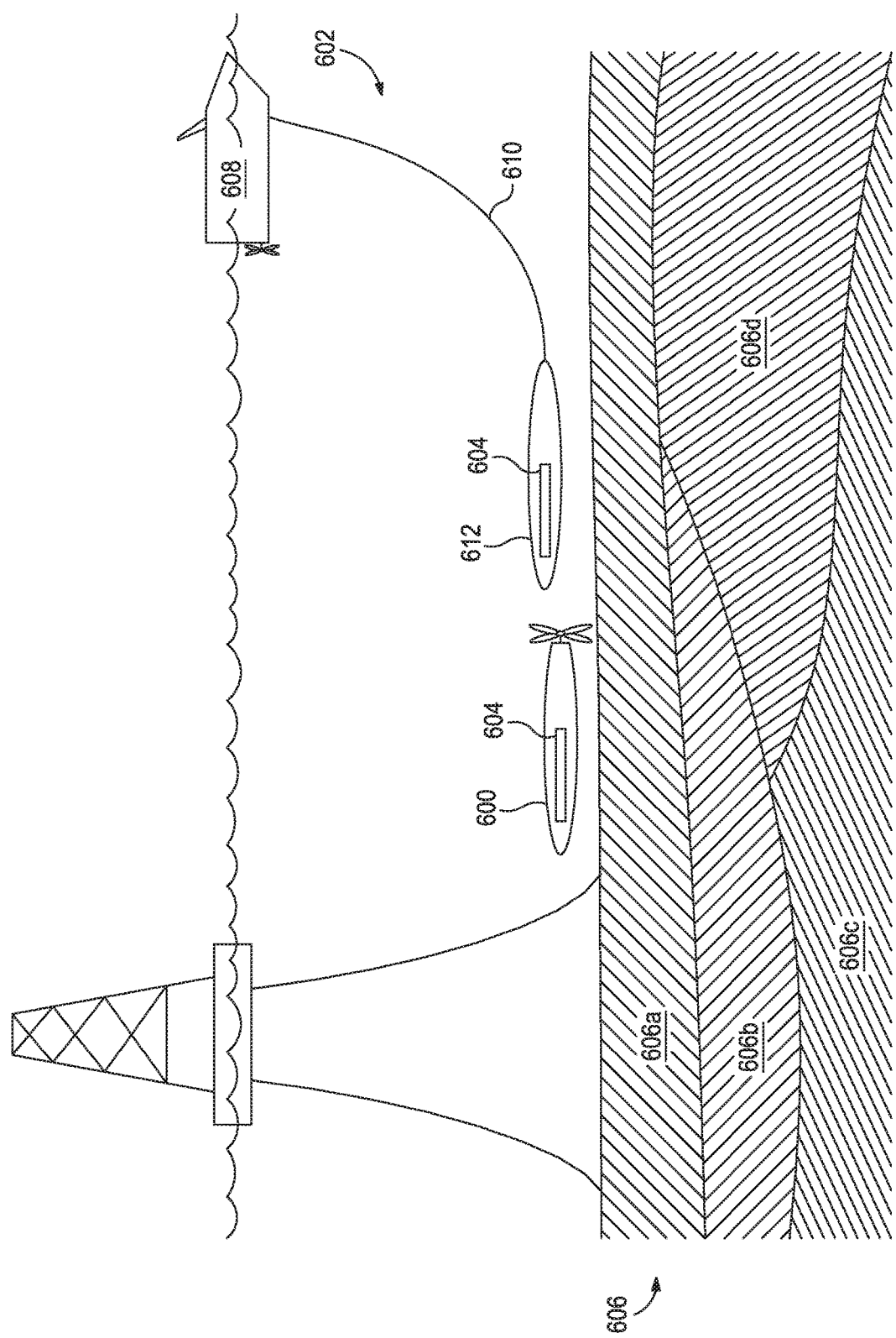
FIG. 6 provides an illustrative diagram of water-vehicles equipped with a matter wave interferometer described herein.

FIG. 6 provides an illustrative diagram of multiple water-vehicles 600,602 positioned relative to a subterranean formation 606 and equipped with a matter wave interferometer 604 for measuring gravity and its derivatives of a subterranean formation 606. The first illustrated water-based vehicle is a submarine 600 equipped with the matter wave interferometer 604. The second illustrated water-based vehicle is a trolling system 602 with a boat 608 couple via a line 610 to a tool 612 that includes the matter wave interferometer 604. The line 610 may optionally include capabilities to communicate data, transmit power, transmit laser light, or a combination thereof between the boat 608 and the tool 612 (e.g., similar to the optional capabilities for the conveyance 408 of FIG. 4).

The matter wave interferometer 604 for each of the vehicles 600,602 may independently be capable of measuring gravity and at least one derivative thereof and preferably at least gravity, gravity gradient, and gravity curvature. The gravity and derivatives thereof measured may be used to identify portions of the formation 606a-d and the boundaries therebetween, the location of fluids within the formation, or a combination thereof.

Each of the vehicles 600,602 and/or the matter wave interferometers 604 may include control systems or portions of control systems (e.g., similar to control system 416 of FIG. 4).

It is recognized that the various embodiments herein directed to control systems, computer control, and analyses, including various blocks, modules, elements, components, methods, and algorithms, can be implemented using computer hardware, software, combinations thereof, and the like. To illustrate this interchangeability of hardware and software, various illustrative blocks, modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application. Further, various components and blocks can be arranged in a different order or partitioned differently, for example, without departing from the scope of the embodiments expressly described.

Computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

Embodiments described herein include, but are not limited to, Embodiments A, B, C, D, and E.

Embodiment A is a method that comprises: positioning a matter wave interferometer relative to a subterranean formation; and measuring a derivative of gravity for multiple locations in the subterranean formation with the matter wave interferometer.

Embodiment B is a method that comprises: positioning a matter wave interferometer relative to a subterranean formation; producing at least one cloud of atoms in the matter wave interferometer; producing a superposition of atoms in two different, spatially separated superimposed clouds from each of the at least one cloud of atoms; propagating the two different, spatially separated superimposed clouds along the matter wave interferometer as the two different, spatially separated superimposed clouds interact with a gravitational field of the subterranean formation; combining the two different, spatially separated superimposed clouds for each of the at least one cloud of atoms with a Raman laser beam; measuring an interference produced by producing and combining the two different, spatially separated superimposed clouds for each of the at least one cloud of atoms; and calculating gravity for the gravitational field of the subterranean formation based on the interference.

Embodiments A and B may further include at least one of the following: Element 1: the method further comprising: injecting water into the subterranean formation; and producing a map of the water in the subterranean formation based on the derivative of gravity; Element 2: wherein positioning the matter wave interferometer relative to the subterranean formation involves: conveying the matter wave interferometer along a wellbore penetrating the subterranean formation; Element 3: wherein the matter wave interferometer is coupled to a land-based vehicle; Element 4: wherein the matter wave interferometer is coupled to an air-based vehicle; Element 5: wherein the matter wave interferometer is coupled to a water-based vehicle; Element 6: the method further comprising: maintaining a position of the matter wave interferometer; and measuring the derivative of gravity for the multiple locations in the subterranean formation at several times; Element 7: Element 6 and the method further comprising: monitoring subsidence of a portion of the subterranean formation over time; Element 8: Element 6 and the method further comprising: injecting water into the subterranean formation; and monitoring movement of the water through the subterranean formation over time; Element 9: wherein the derivative of gravity is the second derivative of gravity, and wherein measuring the second derivative of gravity involves: producing three clouds of atoms; producing a superposition of atoms in two different, spatially separated superimposed clouds from each of the three clouds of atoms; allowing the two different, spatially separated superimposed clouds to propagate along the matter wave interferometer and interact with a gravitational field of the subterranean formation; combining the two different, spatially separated superimposed clouds for each of the three clouds of atoms with a Raman laser beam; measuring an interference produced by producing and combining the two different, spatially separated superimposed clouds for each of the three clouds; and calculating the second derivative of gravity based on the interference, wherein the second derivative of gravity is a gravity curvature; Element 10: Element 9 and wherein positioning the matter wave interferometer relative to the subterranean formation involves: conveying the matter wave interferometer along a wellbore penetrating the subterranean formation; and wherein the Raman laser beam is conveyed to the matter wave interferometer from a surface location at a well site via a slickline; and Element 11: Element 9 and the method further comprising: producing a trapping laser light with a laser not located with the matter wave interferometer; conveying the trapping laser light to the matter wave interferometer with fiber optics; and maintaining a position of the three clouds of atoms with the trapping laser light before producing the superposition of atoms. Exemplary combinations may include, but are not limited to, Element 1 in combination with one of Elements 2-5; Element 1 in combination with Element 6 and optionally one or more of Elements 7-8; one of Elements 2-5 in combination with Element 6 and optionally one or more of Elements 7-8 and optionally further in combination with Element 1; Element 1 in combination with Element 9 and optionally one or more of Elements 10-11; Element 6 and optionally one or more of Elements 7-8 combination with Element 9 and optionally one or more of Elements 10-11; and the like.

Embodiment C is a wellbore tool that comprises: a housing coupled to a conveyance and containing at least a portion of a matter wave interferometer capable of producing, splitting, and recombining two or more clouds of atoms in a magnetic shield. Embodiment C may optionally further include: wherein the conveyance is a slickline that comprises electrical transmission lines and fiber optic cables.

Embodiment D is a system that comprises: the wellbore tool of Embodiment C positioned within a wellbore penetrating a subterranean formation; and a laser coupled to the fiber optic cables, wherein the laser is not positioned within the wellbore.

Embodiment E is a system that comprises: a vehicle positioned relative to a subterranean formation, the vehicle coupled to a matter wave interferometer capable of producing two or more clouds of atoms in a magnetic shield. Embodiment E may optionally include one of the following: Element 13: wherein the vehicle is a land-based vehicle (e.g., a truck); Element 14: wherein the vehicle is an air-based vehicle (e.g., a plane or a drone); and Element 15: wherein the vehicle is a water-based vehicle (e.g., a submarine or trolling system).

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
positioning a matter wave interferometer relative to a subterranean formation; and
measuring a derivative of gravity for multiple locations in the subterranean formation with the matter wave interferometer;
wherein measuring the derivative of gravity involves:
producing a superposition of atoms with a Raman laser beam, generated from a location using a laser;
combining the superposition of atoms with the Raman laser beam; and
maintaining a position of atoms with a plurality of trapping laser lights, produced from other locations using other lasers, before producing the superposition of atoms.

2. The method of claim 1 further comprising:
injecting water into the subterranean formation; and
producing a map of the water in the subterranean formation based on the derivative of gravity.

3. The method of claim 1, wherein positioning the matter wave interferometer relative to the subterranean formation involves: conveying the matter wave interferometer along a wellbore penetrating the subterranean formation.

4. The method of claim 1, wherein h wave interferometer is coupled to a land-based vehicle.

5. The method of claim 1, wherein the matter wave interferometer is coupled to an air-based vehicle.

6. The method of claim 1, wherein the matter wave interferometer is coupled to a water-based vehicle.

7. The method of claim 1 further comprising:
maintaining a position of the matter wave interferometer; and
measuring the derivative of gravity for the multiple locations in the subterranean formation at several times.

8. The method of claim 7 further comprising:
monitoring subsidence of a portion of the subterranean formation over time.

9. The method of claim 7 further comprising:
injecting water into the subterranean formation; and
monitoring movement of the water through the subterranean formation over time.

10. The method of claim 1, wherein the derivative of gravity is the second derivative of gravity, and wherein measuring the second derivative of gravity involves:
producing three clouds of atoms;
producing a superposition of atoms in two different, spatially separated superimposed clouds from each of the three clouds of atoms;
allowing the two different, spatially separated superimposed clouds to propagate along the matter wave interferometer and interact with a gravitational field of the subterranean formation;
combining the two different, spatially separated superimposed clouds for each of the three clouds of atoms with the Raman laser beam;
measuring an interference produced by producing and combining the two different, spatially separated superimposed clouds for each of the three clouds; and
calculating the second derivative of gravity based on the interference, wherein the second derivative of gravity is a gravity curvature.

11. The method of claim 10, wherein positioning the matter wave interferometer relative to the subterranean formation involves: conveying the matter wave interferometer along a wellbore penetrating the subterranean formation; and wherein the Raman laser beam is conveyed to the matter wave interferometer from a surface location at a well site via a slickline.

12. The method of claim 10 further comprising:
producing the trapping laser light with a laser; and
conveying the trapping laser light to the matter wave interferometer with fiber optics.

13. The method of claim 10 further comprising:
producing a 3-dimensional map of the subterranean formation based on the derivative of gravity.

14. A method comprising:
positioning a matter wave interferometer relative to a subterranean formation;
producing at least one cloud of atoms in the matter wave interferometer;
producing a superposition of atoms in two different, spatially separated superimposed clouds from each of the at least one cloud of atoms, wherein the superposition is produced with a Raman laser beam, generated from a location using a laser;
propagating the two different, spatially separated superimposed clouds along the matter wave interferometer as the two different, spatially separated superimposed clouds interact with a gravitational field of the subterranean formation;
combining the two different, spatially separated superimposed clouds for each of the at least one cloud of atoms with a Raman laser beam;
measuring an interference produced by producing and combining the two different, spatially separated superimposed clouds for each of the at least one cloud of atoms;
calculating gravity for the gravitational field of the subterranean formation based on the interference; and
maintaining a position of atoms with a plurality of trapping laser lights, produced from other locations using other lasers, before producing the superposition of atoms.

15. The method of claim 14, wherein the at least one cloud of atoms is two clouds of atoms, and the method further comprises:
calculating a first derivative of gravity for the gravitational field of the subterranean formation based on the interference.

16. A wellbore tool comprising:
a housing coupled to a conveyance and containing at least a portion of a matter wave interferometer capable of producing, splitting, and recombining two or more clouds of atoms in a magnetic shield;
wherein the matter wave interferometer is further capable of measuring the derivative of gravity, wherein measuring the derivative of gravity involves:
producing a superposition of atoms with a Raman laser beam, generated from a location using a laser;
combining the superposition of atoms with a laser light; and
maintaining a position of atoms with a plurality of trapping laser lights, produced from other locations using other lasers, before producing the superposition of atoms.

17. The wellbore tool of claim 16, wherein the conveyance is a slickline that comprises electrical transmission lines and fiber optic cables.

18. A system comprising:
the wellbore tool of claim 17 positioned within a wellbore penetrating a subterranean formation; and
a laser coupled to the fiber optic cables, wherein the laser is not positioned within the wellbore.

19. A system comprising:
a vehicle positioned relative to a subterranean formation, the vehicle coupled to a matter wave interferometer capable of producing two or more clouds of atoms in a magnetic shield;
wherein the matter wave interferometer is further capable of measuring the derivative of gravity, wherein measuring the derivative of gravity involves:
producing a superposition of atoms with a Raman laser beam, generated from a surface location;
combining the superposition of atoms with a laser light; and
maintaining a position of atoms with a plurality of trapping laser lights, produced from other locations using other lasers, before producing the superposition of atoms.

20. The system of claim 19, wherein the vehicle is a drone.

21. The system of claim 19, wherein the vehicle is a submarine.

* * * * *